United States Patent
Jeong et al.

(10) Patent No.: US 7,113,243 B2
(45) Date of Patent: Sep. 26, 2006

(54) IN-PLANE SWITCHING MODE LIQUID CRYSTAL DISPLAY DEVICE COMPRISING COMMON ELECTRODES AND PIXEL ELECTRODES ON BOTH SUBSTRATES AND METHOD OF MANUFACTURING THE SAME

(75) Inventors: Woo Nam Jeong, Kyonggi-do (KR); Hyun Suk Jin, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 135 days.

(21) Appl. No.: 10/826,691

(22) Filed: Apr. 19, 2004

(65) Prior Publication Data
US 2004/0263749 A1    Dec. 30, 2004

(30) Foreign Application Priority Data
Apr. 19, 2003    (KR)    .............. 10-2003-0024896

(51) Int. Cl.
*G02F 1/1343* (2006.01)
(52) U.S. Cl. .................................. 349/141
(58) Field of Classification Search ............. 349/141
See application file for complete search history.

(56) References Cited

U.S. PATENT DOCUMENTS

| 4,333,708 A | * | 6/1982 | Boyd et al. ............... 349/129 |
| 6,222,602 B1 | * | 4/2001 | Aratani et al. ............ 349/141 |
| 6,870,587 B1 | * | 3/2005 | Shibahara et al. ......... 349/141 |

* cited by examiner

Primary Examiner—Andrew Schechter
Assistant Examiner—Richard Kim
(74) *Attorney, Agent, or Firm*—McKenna Long & Aldridge LLP

(57) ABSTRACT

An In-Plane switching mode liquid crystal display (LCD) device includes: lower and upper substrates; gate and data lines crossing each other on the lower substrate to define a pixel region; a plurality of first common electrodes diverging in the pixel region at fixed intervals; a first pixel electrode in the pixel region between the first common electrodes; second common electrodes and second pixel electrodes on the upper substrate respectively corresponding to the first common electrodes and the first pixel electrodes on the lower substrate; and a liquid crystal layer between the lower and upper substrates.

22 Claims, 9 Drawing Sheets

IN-PLANE SWITCHING MODE LIQUID CRYSTAL DISPLAY DEVICE COMPRISING COMMON ELECTRODES AND PIXEL ELECTRODES ON BOTH SUBSTRATES AND METHOD OF MANUFACTURING THE SAME

This application claims the benefit of the Korean Application No. P2003-24896 filed on Apr. 19, 2003, which is hereby incorporated by reference.

BACKGROUND OF THE INVENTION

1. Field of the Invention

The present invention relates to a liquid crystal display (LCD) device, and more particularly, to an In-Plane switching mode liquid crystal display (LCD) device and a method of manufacturing the same.

2. Discussion of the Related Art

As an information society develops, so does the demand for various types of displays. Recently, efforts have been made to research and develop various types of flat display panels, such as Liquid Crystal Display (LCD), Plasma Display Panel (PDP), Electroluminescent Display (ELD), Vacuum Fluorescent Display (VFD), and the like. An LCD is widely used as a substitution for a Cathode Ray Tube (CRT) because the LCD has the characteristics or advantages of high quality image, light weight, shallow depth, compact size, and low power consumption. An LCD is applicable for use in devices that receive display signals, such as a television, computer monitor, and the like. Various technical developments for different types of LCD have been made such that LCDs play a role as an image display in various fields. However, in order for an LCD to be used as a general display device in a variety of various fields, the LCD needs to realize a high quality image that has high resolution, high brightness, and wide screen, as well as, maintain the characteristics of light weight, shallow depth, compact size, and low power consumption.

In general, an LCD device includes an LCD panel for displaying a picture image, and a driving part for applying a driving signal to the LCD panel. The LCD panel includes first and second glass substrates that are bonded to each other with a predetermined gap therebetween, and a liquid crystal layer positioned in the gap between the first and second glass substrates. The first glass substrate (TFT array substrate) includes a plurality of gate lines, a plurality of data lines, a plurality of pixel electrodes, and a plurality of thin film transistors. The plurality of gate lines are formed on the first glass substrate at fixed intervals. The plurality of data lines are formed at fixed intervals and are perpendicular to the plurality of gate lines. The plurality of pixel electrodes, arranged in a matrix-type configuration, are respectively formed in pixel regions defined between the plurality of gate and the plurality of data lines. The plurality of thin film transistors are switched in accordance with signals on the gate lines such that signals on the respective data lines are transmitted to the respective pixel electrodes.

The second glass substrate (color filter substrate) includes a black matrix layer that excludes light from specific regions except for the pixel regions of the first substrate. An R/G/B color filter layer for displaying various colors is positioned in the black matrix layer. A common electrode is also positioned on the second glass substrate (color filter substrate) to obtain the picture image.

The LCD device is driven according to optical anisotropy and polarizability of the liquid crystal. Liquid crystal molecules have directional orientation characteristics because each of the liquid crystal molecules has a long thin shape. An applied electric field can control the alignment direction of the liquid crystal molecules. The alignment direction of the liquid crystal molecules is controlled by the electric field such that the light is refracted along the alignment direction of the liquid crystal molecules by the optical anisotropy of the liquid crystal, thereby displaying a picture image.

There are various types of liquid crystal displays. In particular, an Active Matrix Liquid Crystal Display (AM-LCD) contains thin film transistors that are respectively connected to pixel electrodes. The pixel electrodes, which are on one substrate, are arranged in a matrix and confront a common electrode, which is on the other substrate. The pixel electrodes and common electrodes drive liquid crystal molecules by applying an electric field between the substrates in a direction vertical to the substrates. The AM-LCD provides excellent resolution for displaying moving images.

FIG. 1 is an exploded perspective view illustrating a general twisted nematic (TN) mode LCD device of the related art. As shown in FIG. 1, the TN mode LCD device includes a lower substrate 1 and an upper substrate 2 bonded to each other with a predetermined gap therebetween. A liquid crystal layer 3 is positioned in the gap between the lower substrate 1 and the upper substrate 2. More specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals. The plurality of data lines 5 are formed in a direction perpendicular to the plurality of gate lines 4 at fixed intervals. A plurality of pixel regions P are defined between the plurality of gate lines 4 and the plurality of data lines 5. A plurality of pixel electrodes 6 are respectively formed in the pixel regions P. A plurality of thin film transistors T are respectively formed at crossings of the plurality of gate lines 4 and the plurality of data lines 5. The upper substrate 2 includes a black matrix layer 7 that excludes light from specific regions except for the pixel regions P, R/G/B color filter layer 8 for displaying various colors, and a common electrode 9 for displaying a picture image.

The thin film transistor T includes a gate electrode, a gate insulating layer (not shown), an active layer, a source electrode, and a drain electrode. The gate electrode for the thin film transistor T projects from the gate line 4. The gate insulating layer (not shown) is formed on an entire surface of the lower substrate. Then, the active layer of the thin film transistor T is formed on the gate insulating layer above the gate electrode. The source electrode for the thin film transistor T projects from the data line 5, and the drain electrode is formed opposite to the source electrode. The aforementioned pixel electrode 6 is connected to the drain electrode and is formed of transparent conductive metal having great transmittance, such as indium-tin-oxide (ITO).

In the aforementioned LCD device, liquid crystal molecules of the liquid crystal layer 3 positioned on the pixel electrode 6 are aligned in response to a signal applied via the thin film transistor T. Light transmittance is controlled according to alignment of liquid crystal, thereby displaying a picture image. In other words, an LCD panel drives the liquid crystal molecules by an electric field perpendicular to the lower and upper substrates. This method obtains great transmittance and high aperture ratio. Also, it is possible to prevent liquid crystal cells from being damaged by static electricity since the common electrode 9 of the upper substrate 2 serves as the ground. However, by driving the liquid crystal molecules with an electric field that is perpendicular to the lower and upper substrates, it is difficult to obtain a wide viewing angle.

In order to overcome this narrow viewing angle problem, an In-Plane switching mode LCD device is used. A related art In-Plane Switching (IPS) mode LCD device will be described with reference to the FIGS. 2–6. FIG. 2 is a cross-sectional view illustrating electric field and alignment direction of liquid crystal in a related art In-Plane switching mode LCD device.

In the related art In-Plane switching mode LCD device, as shown in FIG. 2, a common electrode 13 and a pixel electrode 15 are formed on the same plane of a lower substrate 10. Then, the lower substrate 10 is bonded to an upper substrate 20 with a predetermined gap therebetween. The liquid crystal 3 is positioned in the gap between the lower substrate 10 and the upper substrate 20. The liquid crystal 3 is driven by an electric field formed between the common electrode 13 and the pixel electrode 15 on the lower substrate 10.

FIG. 3A and FIG. 3B illustrate the alignment direction of liquid crystal when a voltage is turned off/on in the related art In-Plane switching mode LCD device.

FIG. 3A illustrates the related art In-Plane switching mode LCD device when the voltage is turned off. That is, an electric field, which is parallel to the lower and upper substrates, is not applied to the common electrode 13 or the pixel electrode 15. Accordingly, there is no change in alignment of the liquid crystal 3.

FIG. 3B illustrates the related art In-Plane switching mode LCD device when the voltage is turned on. That is, an electric field, which is parallel to the lower and upper substrates, is generated between the common electrode 13 and the pixel electrode 15. Accordingly, alignment of the liquid crystal 3 is changed. In more detail, the alignment of the liquid crystal 3 is twisted at 45° as compared to the alignment of liquid crystal when the voltage is turned off. During the on state, the twisted direction of liquid crystal adjacent to the lower substrate is identical to the horizontal direction of the common electrode 13 and the pixel electrode 15.

As mentioned above, the related art In-Plane switching mode LCD device has the common electrode 13 and the pixel electrode 15 on the same plane. Thus, it has advantageous characteristics, such as a wide viewing angle. For example, along a front direction of the In-Plane switching mode LCD device, a viewer can have a viewing angle of 70° in all directions (i.e., lower, upper, left, and right directions). Furthermore, the related art In-Plane switching mode LCD device has simplified fabrication process steps, and reduced color shift. However, the related art In-Plane switching mode LCD device has the problems of low light transmittance and low aperture ratio since the common electrode 13 and the pixel electrode 15 are formed on the same substrate.

In the meantime, the related art In-Plane switching mode LCD device forms the different electric fields according to arrangement of the respective electrodes. FIG. 4A and FIG. 4B illustrate the electric field according to arrangements of the respective electrodes.

Referring to FIG. 4A, the common electrode 13 and the pixel electrode 15 are positioned at a predetermined interval so as to be completely in between the lower and upper substrates (not shown). When a voltage signal is applied to the common electrode 13 and the pixel electrode 15 so as to generate a voltage difference between the two electrodes, an electric field, parallel to the substrates, having no distortion is generated directly between the common electrode 13 and the pixel electrode 15.

Referring to FIG. 4B, the common electrode 13 and the pixel electrode 15 are formed on only one of the lower and upper substrates (not shown) at a predetermined interval therebetween so as to leave a space between the electrodes and the other substrate. When a voltage signal is applied so as to generate a voltage difference between the two electrodes 13 and 15, an electric field parallel to the substrate above the common electrode 13 and the pixel electrode 15 have curved distortions at portions adjacent to the common electrode 13 and the pixel electrode 15.

The arrangement of the respective electrodes shown in FIG. 4A is ideal for the drive of liquid crystal in the In-Plane switching mode LCD device. However, the arrangement of the electrodes shown in FIG. 4A has difficulties in the manufacturing process, such as positioning the liquid crystal in the gap between the substrates. That is, when forming the two electrodes according to the arrangement shown in FIG. 4A, it is impossible to inject the liquid crystal between the lower and upper substrates. Meanwhile, as shown in FIG. 4B, in case of the general In-Plane switching mode LCD device forming the common electrode 13 and the pixel electrode 15 on any one of the lower and upper substrates, a great voltage difference between the common electrode 13 and the pixel electrode 15 is required to form the electric field parallel to the lower and upper substrates adjacent to an upper substrate from which the electrodes are separated, thereby causing the problem of increased power consumption.

Hereinafter, alignment of liquid crystal before and after applying the voltage to the electrodes of the related art In-Plane switching mode LCD device will be described as follows. FIG. 5 is a plane view illustrating the related art In-Plane switching mode LCD device. FIG. 6A and FIG. 6B are cross-sectional views illustrating alignment of liquid crystal before and after applying the voltage along the line I—I' of FIG. 5. As shown in FIG. 5, FIG. 6A and FIG. 6B, the related art In-Plane switching mode LCD device includes a lower substrate 10, an upper substrate 20 facing the lower substrate 10, and a liquid crystal layer formed between the lower substrate 10 and the upper substrate 20.

Referring to FIG. 5, a gate line 11 and a data line 12 cross each other on the lower substrate 10 to define a pixel region. Then, a common electrode 13 and a pixel electrode 15 are formed at a predetermined interval within the pixel region. A thin film transistor TFT is formed within the pixel region on the lower substrate 10. The thin film transistor TFT includes a gate electrode 11a, a gate insulating layer (for reference, '14' of FIG. 6A and FIG. 6B), a semiconductor layer 18, a source electrode 12a and a drain electrode 12b. The gate electrode 11a projects from the gate line 11. The gate insulating layer is formed on an entire surface of the lower substrate 10 including the gate electrode 11a. The semiconductor layer 18 is formed overlapping the gate electrode 11a. The source electrode 12a projecting from the data line 12 is formed at a predetermined interval from the drain electrode 12. The source electrode 12a and drain electrode 12b are formed at both sides of the semiconductor layer 18. The drain electrode 12b of the thin film transistor TFT is connected with the pixel electrode 15.

The common electrode 13 is formed at a predetermined interval from the pixel electrode 15. The common electrode 13 may be simultaneously formed when forming the gate line 11 or the data line 12. In the drawings, the common electrode 13 is formed in the same layer as the data line 12.

Furthermore, a passivation layer 16 is formed between the data line 12 and the pixel electrode 15. The passivation layer (for reference, '16' of FIG. 6A and FIG. 6B) is formed of the same material as the gate insulating layer 14, such as an inorganic insulating layer of SiNx or SiOx, or an organic insulating layer of acryl, polyimide, BenzoCycloButene (BCB) or photo polymer.

Subsequently, a first alignment layer 17 is formed on the entire surface of the lower substrate 10 including the passivation layer 16 and the pixel electrode 15. Thus, when the common electrode 13 receives a voltage signal from a common line 19, and a voltage signal is applied to the pixel electrode 15 through the drain electrode 12b, an electric field parallel to the substrates is generated to drive the liquid crystal.

The upper substrate 20 includes a black matrix layer 21, a color filter layer 22, and a second alignment layer 23. The black matrix layer 21 is formed to correspond to specific regions of the lower substrate except for the pixel regions, thereby preventing light leakage in the specific regions. A color filter layer 22 is formed within the black matrix layer 21 to obtain R/G/B color throughout the pixel regions. The second alignment layer 23 is formed to so as to define initial orientation of the liquid crystal.

The first alignment layer 17 and the second alignment layer 23 are respectively formed on the entire surfaces of the lower substrate 10 and the upper substrate 20 to define the initial orientation of the liquid crystal. Accordingly, liquid crystal molecules adjacent to the first alignment layer 17 and the second alignment layer 23 are oriented in accordance with the alignment direction of the first and second alignment layers.

Referring to FIG. 6A, before applying the voltage, the orientation of the liquid crystal is determined by the rubbing direction of the first alignment layer 17 and the second alignment layer 23, respectively formed on the lower substrate 10 and upper substrate 20. Accordingly, as shown in FIG. 6A, the liquid crystal molecules positioned along the vertical direction of the common electrodes 13 and pixel electrodes 15 have similar round shapes. As shown in FIG. 6A, before applying the voltage, the related art In-Plane switching mode LCD device operates in a Normally Black, whereby it is impossible to perform light transmission.

Referring to FIG. 6B, when the voltage is applied to the common electrode 13 and the pixel electrode 15, the electric field generates between the common electrode 13 and the pixel electrode 15 formed on the same substrate. Thus, the liquid crystal molecules are aligned along the electric field formed between the common electrode 13 and the pixel electrode 15. In this case, the liquid crystal molecules positioned along the vertical direction to the common electrode 13 and the pixel electrode 15d have a long elliptical shape in this view rather than the circular shape of the original form of liquid crystal molecule since the direction of the liquid crystal molecules has been changed.

After applying the voltage to the general In-Plane switching mode LCD device, the light is transmitted so that a white state is displayed. Since there are liquid crystal molecules positioned where the electric field divides adjacent to the common electrode 13 and the pixel electrode 15, it is difficult to move the liquid crystal molecules to the predetermined direction by applying the voltages to the electrodes. Thus, in the display mode, disinclination generates at the portions of the electrodes where the electric field divides. To address this disinclination, the common electrode 13 and the pixel electrode 15 are formed of metal or ITO/metal alloy to prevent light leakage through the common electrode 13 and the pixel electrode 15.

However, the related art In-Plane switching mode LCD device has the following disadvantages. In the related art In-Plane switching mode LCD device, the liquid crystal is driven by the electric field parallel to the lower and upper substrates between the common electrode and the pixel electrode. At this time, the common electrode and the pixel electrode are formed on any one of the lower and upper substrates. Accordingly, the electric field parallel to the lower and upper substrates is only generated adjacent to the one substrate having the common and pixel electrodes thereon. That is, in order to drive the liquid crystal molecules adjacent to the other substrate having no common and pixel electrodes thereon, it is necessary to greatly increase voltage difference to the common and pixel electrodes, thereby causing the problem of increase in power consumption.

SUMMARY OF THE INVENTION

Accordingly, the present invention is directed to an In-Plane switching mode liquid crystal display (LCD) device and a method of manufacturing the same that substantially obviates one or more problems due to limitations and disadvantages of the related art.

An object of the present invention is to provide an In-Plane switching mode LCD device and a method of manufacturing the same for decreasing power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an In-Plane switching mode liquid crystal display (LCD) device includes: lower and upper substrates; gate and data lines crossing each other on the lower substrate to define a pixel region; a plurality of first common electrodes diverging in the pixel region at fixed intervals; a first pixel electrode in the pixel region between the first common electrodes; second common electrodes and second pixel electrodes on the upper substrate respectively corresponding to the first common electrodes and the first pixel electrodes on the lower substrate; and a liquid crystal layer between the lower and upper substrates.

In another aspect, a method for manufacturing an In-Plane switching mode liquid crystal display (LCD) device includes the steps of preparing lower and upper substrates; forming gate and data lines crossing each other on the lower substrate to define a pixel region; forming a plurality of first common electrodes diverging in the pixel region at fixed intervals; forming a first pixel electrode in the pixel region between the first common electrodes; forming a second common electrode on the upper substrate corresponding to the first common electrode; forming a second pixel electrode on the upper substrate corresponding to the first pixel electrode; and forming a liquid crystal layer between the lower and upper substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an In-Plane switching mode liquid crystal display (LCD) device according to the present invention and a method of manufacturing the same will be described with reference to the accompanying drawings.

Figure 1:
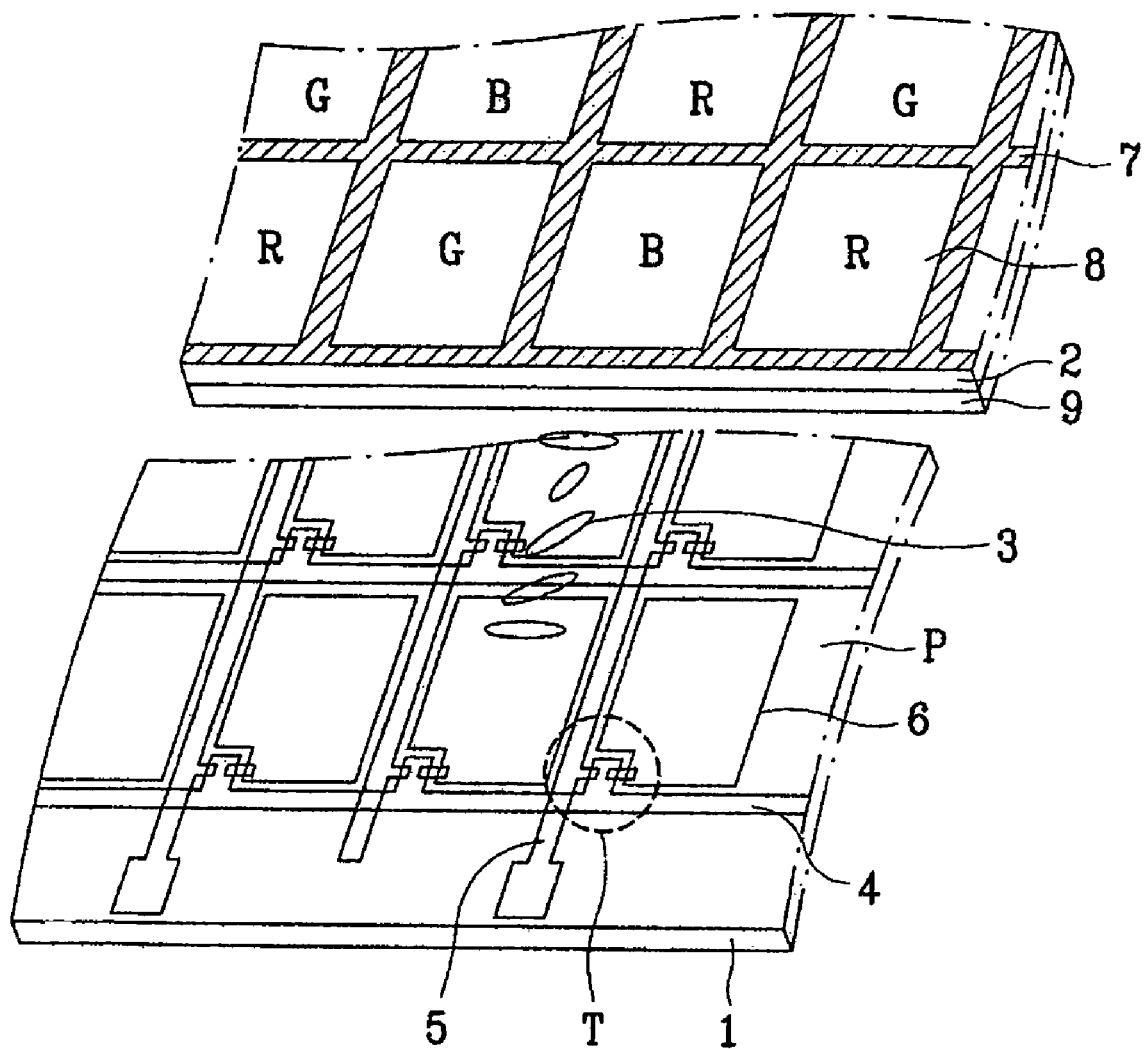
FIG. 1 is an exploded perspective view illustrating a general twisted nematic (TN) mode LCD device of the related art.
Figure 2:
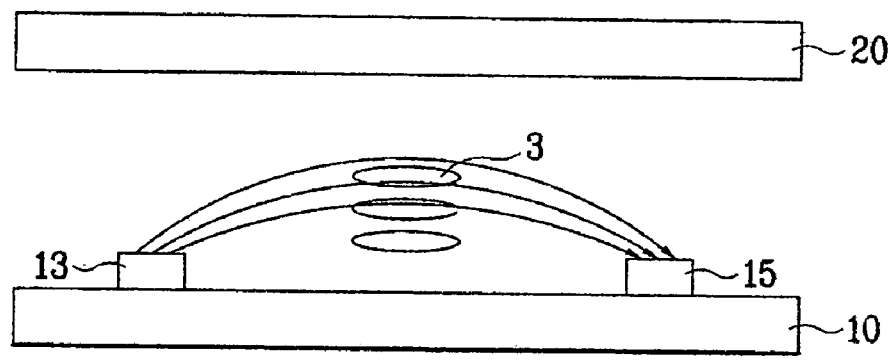
FIG. 2 is a cross-sectional view illustrating electric field and alignment direction of liquid crystal in a related art In-Plane switching mode LCD device.
Figure 3A:
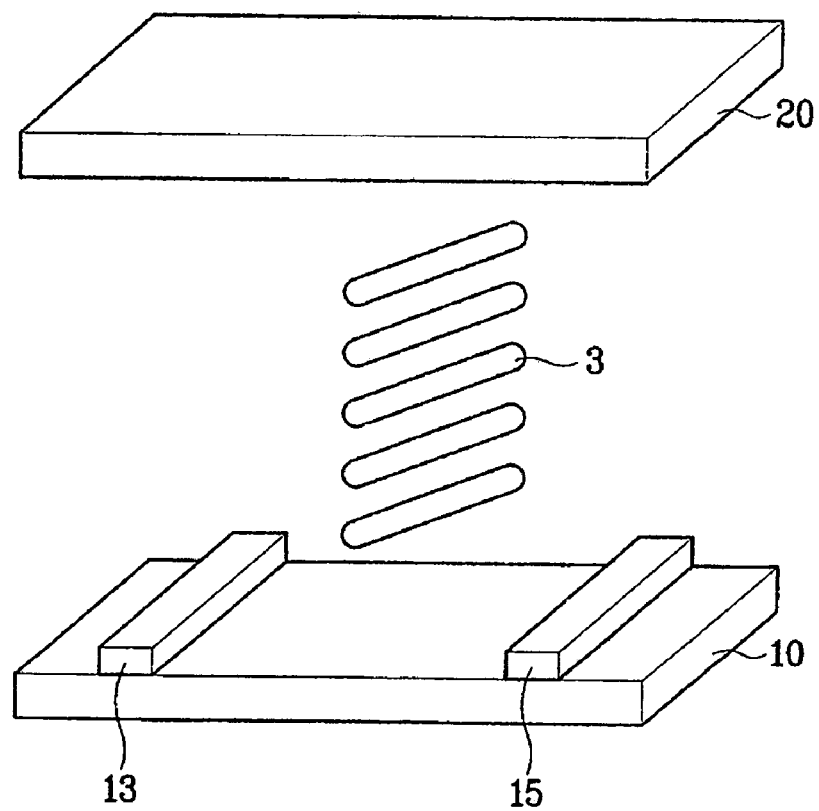
FIG. 3A and FIG. 3B illustrate alignment direction of liquid crystal when a voltage is turned on/off in a related art In-Plane switching mode LCD device.
Figure 3B:
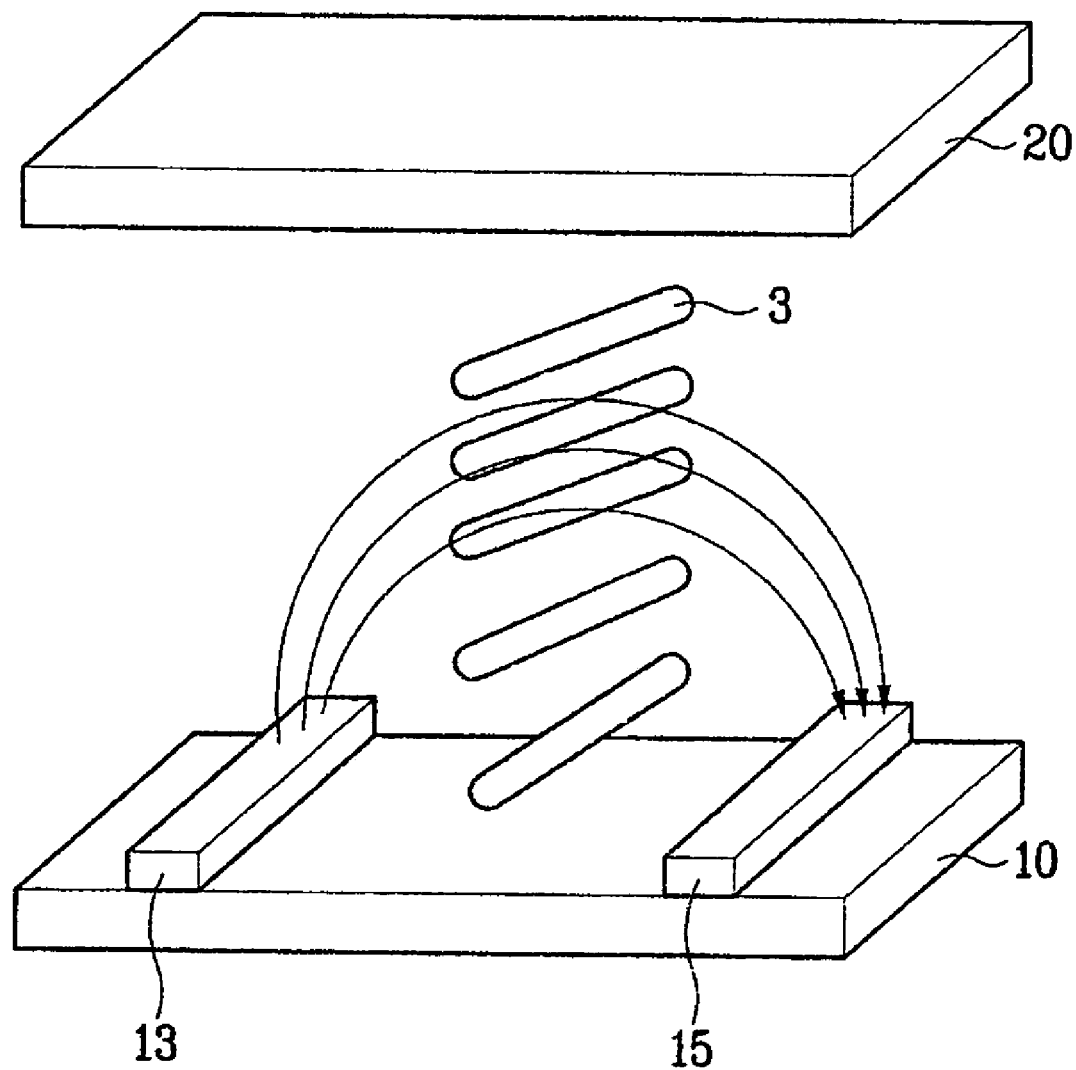
Figure 4A:
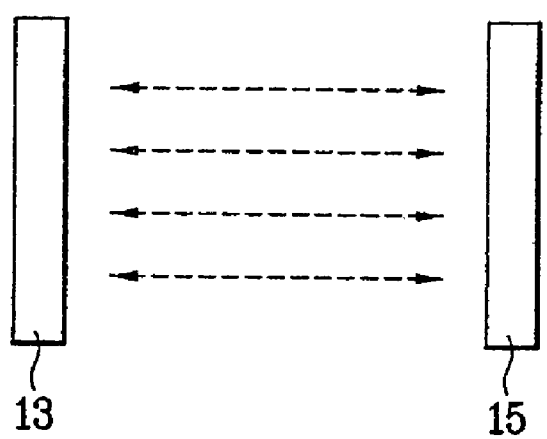
FIG. 4A and FIG. 4B illustrate electric field according to arrangement of respective electrodes.
Figure 4B:
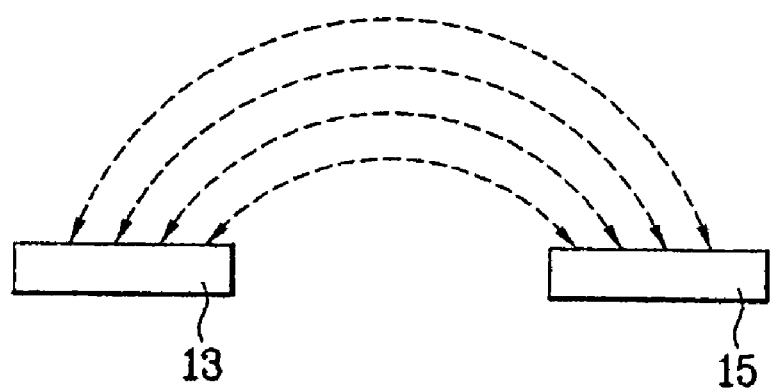
Figure 5:
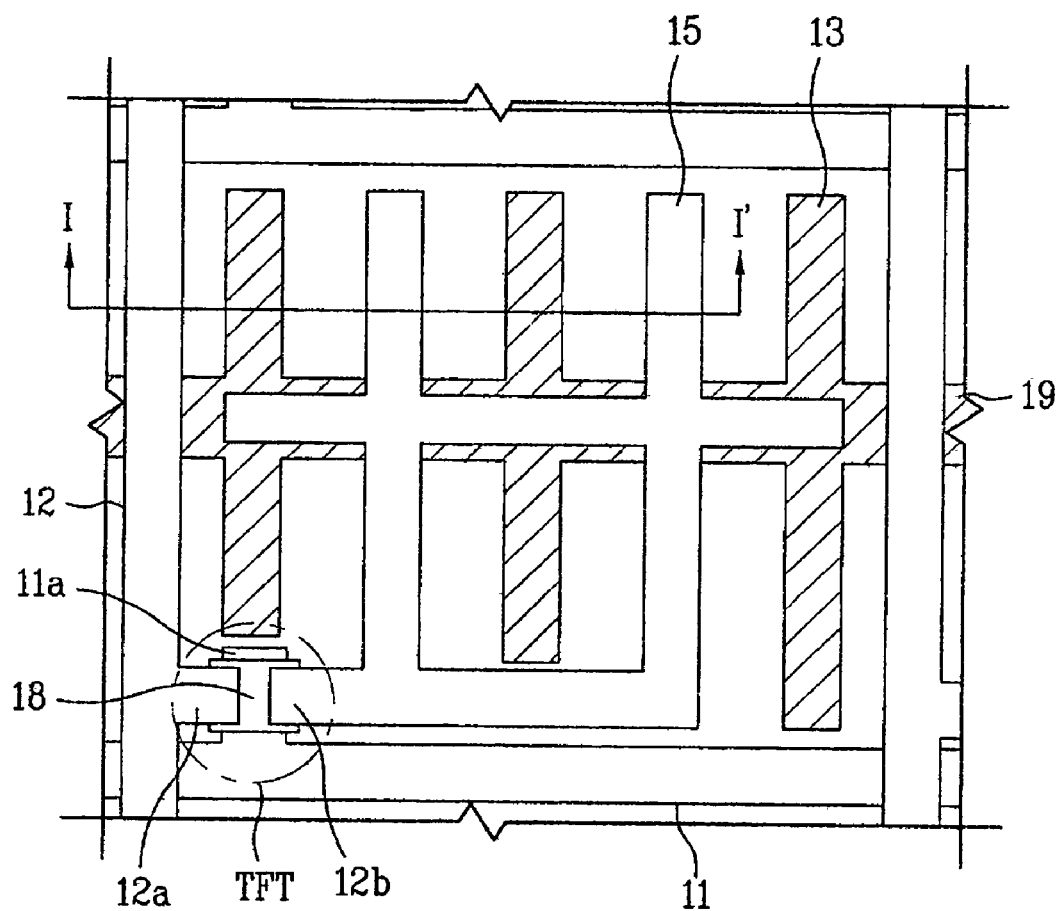
FIG. 5 is a plane view illustrating a related art In-Plane switching mode LCD device.
Figure 6A:
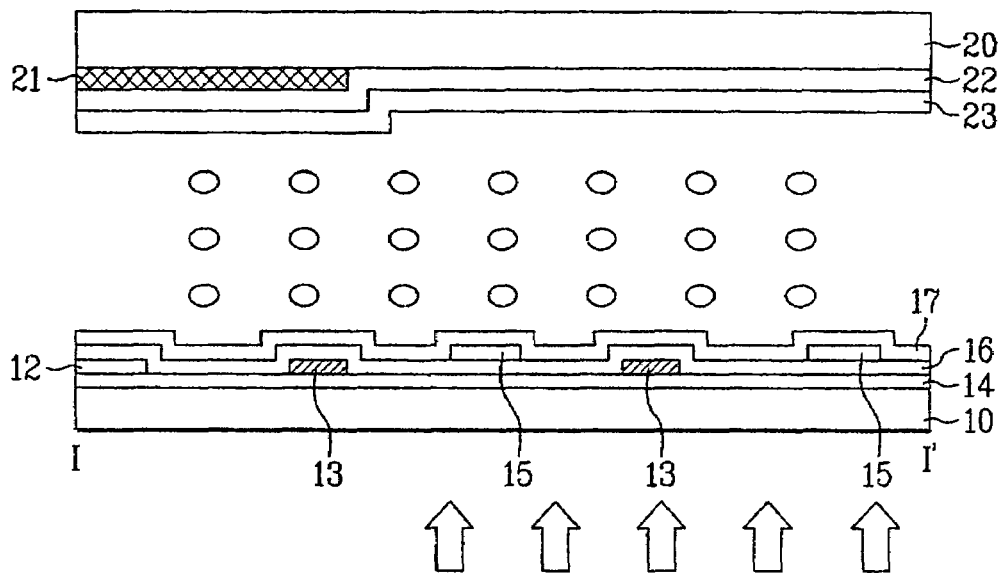
FIG. 6A and FIG. 6B are cross-sectional views illustrating alignment of liquid crystal before and after applying a voltage on the line I—I' of FIG. 5.
Figure 6B:
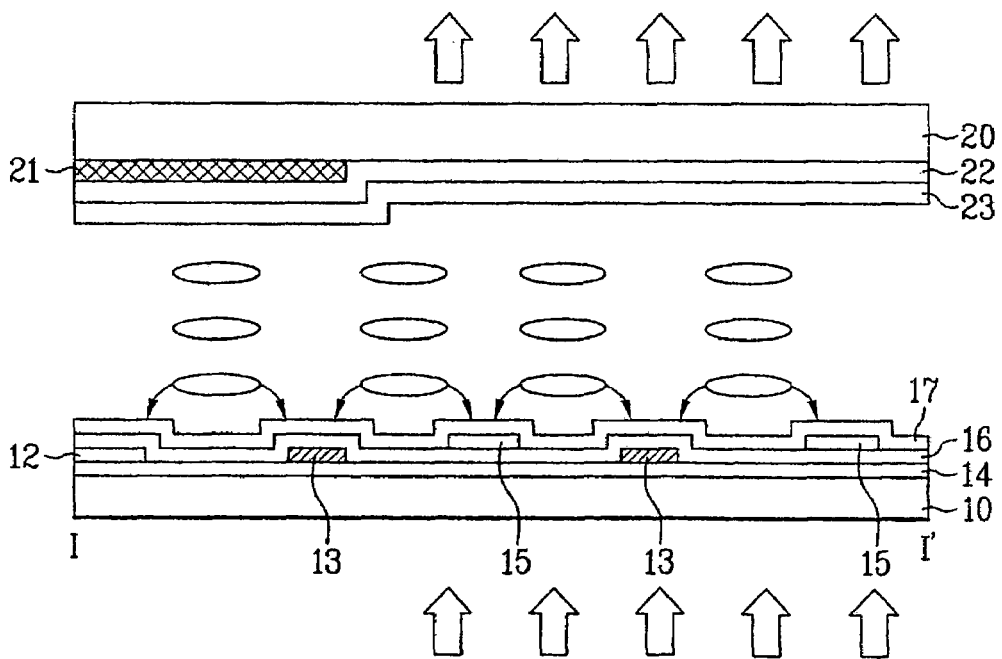
Figure 7:
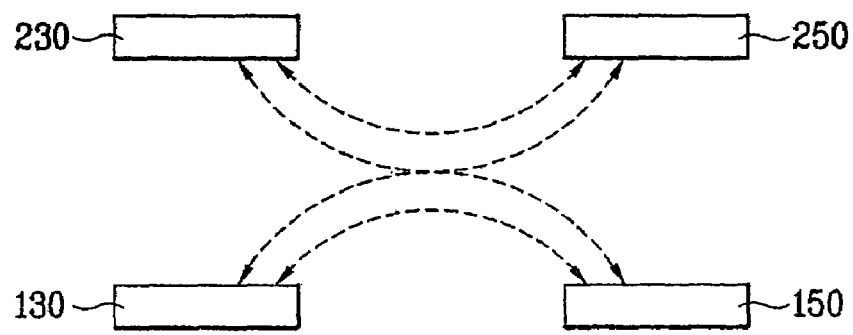
FIG. 7 is a schematic view illustrating electric field when applying a voltage to respective electrodes in arrangement of common and pixel electrodes on each of lower and upper substrates of an In-Plane switching mode LCD device according to an embodiment of the present invention.

FIG. 7 is a schematic view illustrating an electric field when applying a voltage to respective electrodes in an arrangement of common and pixel electrodes on each of lower and upper substrates of an In-Plane switching mode LCD device according to an embodiment of the present invention.

As shown in FIG. 7, the In-Plane switching mode LCD device according to an embodiment of the present invention includes a lower substrate (not shown), an upper substrate (not shown), and a liquid crystal layer (not shown). A first common electrode 130 and a first pixel electrode 150 are formed on the lower substrate with a predetermined gap therebetween. A second common electrode 230 and a second pixel electrode 250 are formed on the upper substrate in correspondence with the first common electrode 130 and the pixel electrode 150 of the lower substrate. A liquid crystal layer is formed in the gap between the lower and upper substrates. Accordingly, the common and pixel electrodes are formed on each of the lower and upper substrates, whereby an electric field parallel to the lower and upper substrates is generated at a lower surface of the upper substrate and an upper surface of the lower substrate. That is, even though a voltage difference is decreased between the common electrodes 130/230 and the pixel electrodes 150/250, liquid crystal molecules are uniformly arrange throughout the liquid crystal in a region between the upper and lower substrates.

Figure 8:
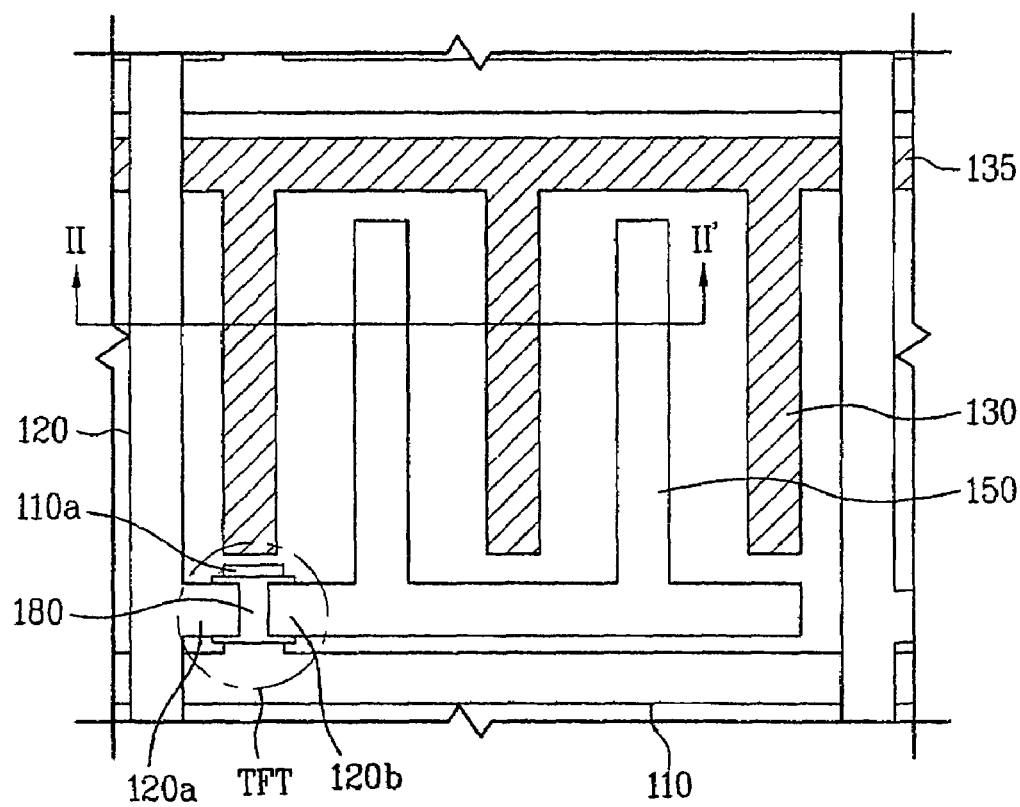
FIG. 8 is a plane view illustrating the lower substrate of the In-Plane switching mode LCD device according to an embodiment of the present invention.
Figure 9:
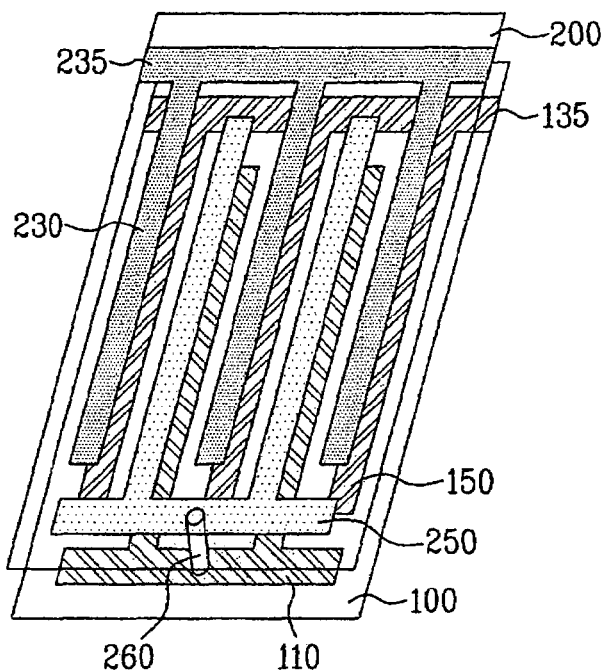
FIG. 9 is a perspective view illustrating the common and pixel electrodes formed on both of the lower and upper substrates of the In-Plane switching mode LCD device according to an embodiment of the present invention.
Figure 10:
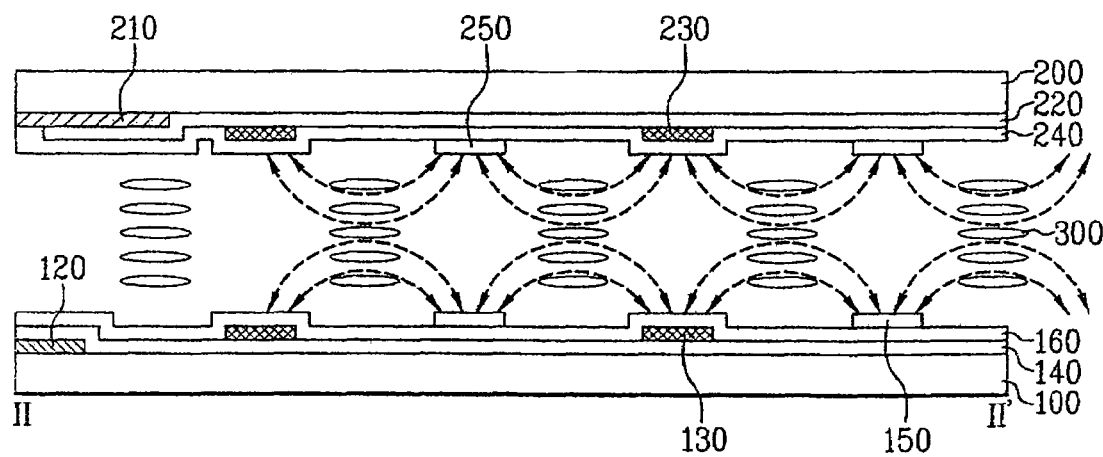
FIG. 10 is a cross-sectional view illustrating alignment of liquid crystal when applying a voltage on the line II—II' of FIG. 8.
Figure 11:
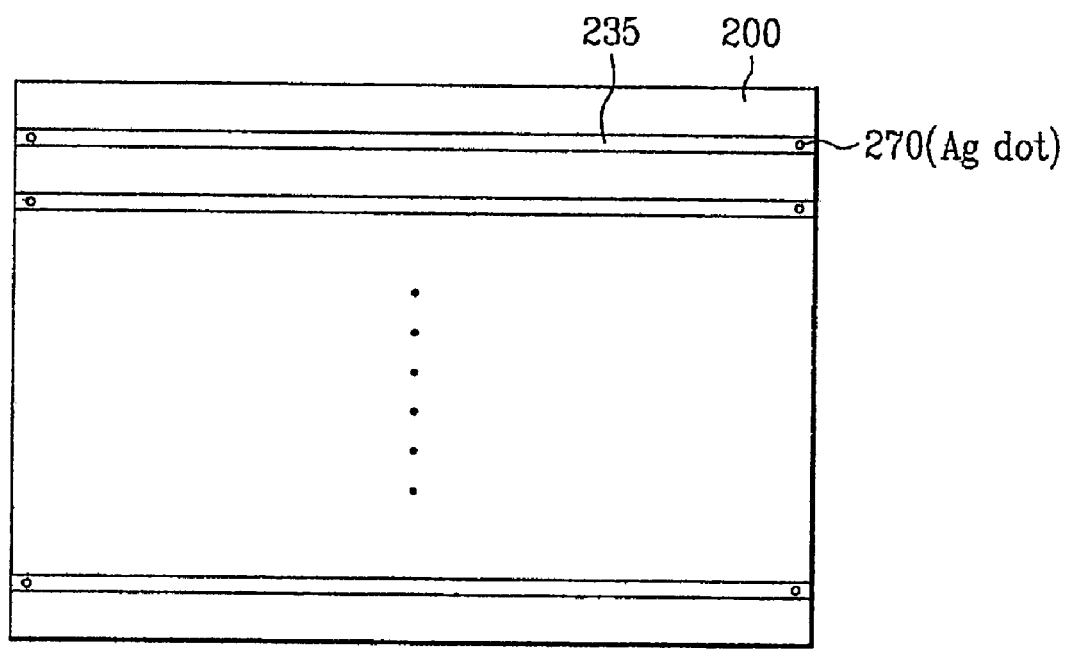
FIG. 11 is a plane view illustrating Ag dot formed on the upper substrate of the In-Plane switching mode LCD device according to an embodiment of the present invention.

FIG. 8 is a plane view illustrating the lower substrate of the In-Plane switching mode LCD device according to an embodiment of the present invention. FIG. 9 is a perspective view illustrating the common and pixel electrodes formed on both of the lower and upper substrates of the In-Plane switching mode LCD device according to an embodiment of the present invention. FIG. 10 is a cross-sectional view illustrating an alignment of liquid crystal when applying a voltage on the line II—II' of FIG. 8. FIG. 11 is a plane view illustrating Ag dot formed on the upper substrate of the In-Plane switching mode LCD device according to an embodiment of the present invention.

As shown in FIG. 8 to FIG. 11, the In-Plane switching mode LCD device according to an embodiment of the present invention includes a lower substrate 100, an upper substrate 200 facing the lower substrate 100, and a liquid crystal layer 300 formed between the lower substrate 100 and the upper substrate 200.

Referring to FIG. 8, gate lines 110 and data lines 120 are formed on the lower substrate 100. The gate lines 110 and data lines 120 cross each other and define a pixel region. A first common line 135 is formed on the lower substrate 100 passing through the pixel region and in parallel with the gate line 110. In addition, a plurality of first common electrodes 130 that diverge from the first common line 135 are formed in the pixel region.

A thin film transistor (TFT) is formed adjacent to where the gate line 110 and the data line 120 for the pixel region cross. A first pixel electrode 150, which is parallel to the first common electrode 130, is connected to a drain electrode 120b of the thin film transistor TFT. Also, the first pixel electrode 150 is formed in the pixel region at a predetermined interval with the first common electrode 130.

A common voltage is applied from an external common voltage driver to the first common line 135. When a gate pulse is applied to the gate line 110 through the thin film transistor TFT, a data signal of the data line 120 is applied to the first pixel electrode 150. In this respect, when the common voltage is applied to the first common electrode 130 along with the voltage signal being applied to the first pixel electrode 150, an electric field parallel to the lower and upper substrates is generated between the first common electrode 130 and the first pixel electrode 150, thereby driving the liquid crystal.

The thin film transistor TFT includes a gate electrode 110a, a gate insulating layer (for reference, '105' of FIG. 10), a semiconductor layer 180, a source electrode 120a and a drain electrode 120b. The gate electrode 110a projects from the gate line 110. The gate insulating layer is formed on an entire surface of the lower substrate 110 including the gate electrode 110a. The semiconductor layer 180 is formed on the gate insulating layer above the gate electrode 110a. The source electrode 120a projects from the data line 120 and is formed at a predetermined interval from the drain electrode 120b. Also, the source electrode 120a and the drain electrode 120b are formed at both sides of the semiconductor layer 180. The drain electrode 120b of the thin film transistor TFT is connected with the first pixel electrode 150.

As shown in FIG. 9, the upper substrate 200 includes the second common electrode 230 and the second pixel electrode 250, which respectively correspond to the first common electrode 130 and the first pixel electrode 150 formed on the lower substrate 100. The second common electrode is connected to a second common line 235.

Referring to FIG. 10, the gate line ('110' of FIG. 8) and the gate electrode ('110a' of FIG. 8) are formed on the lower substrate 100. Then, the gate insulating layer 105 is formed on the entire surface of the lower substrate 100 including the gate line. Subsequently, the semiconductor layer ('180' of FIG. 8) and the data line 120 are formed on the gate insulating layer 105 perpendicular to the gate line. Also, a first insulating layer 140 is formed on an entire surface of the lower substrate including the data line 120. The first common electrode 130 is formed on the first insulating layer 140 in parallel to the data line, and a passivation layer 160 is formed on the entire surface of the lower substrate including the first common electrode 130. Then, the first pixel electrode 150 is formed on the passivation layer 160 between the respective first common electrodes 130.

On the upper substrate 200, a black matrix layer 210 is formed corresponding to specific regions of the lower substrate except for the pixel regions, thereby preventing light leakage in the specific regions. Also, a color filter layer 220 is formed to obtain R/G/B color throughout the pixel regions. Then, the second common electrode 230 is formed on the color filter layer 220 corresponding to the first common electrode 130 of the lower substrate 100. Then, a second insulating layer 240 is formed on an entire surface of the upper substrate 200, including the second common electrode 230. The second pixel electrode 250 is formed on the second insulating layer 240 corresponding to the first pixel electrode 150 of the lower substrate.

The second pixel electrode 250 of the upper substrate 200 is electrically connected with the first pixel electrode 150 of the lower substrate 100 through a conductive bar 260, such that a data voltage applied via the drain electrode 120b of the thin film transistor TFT is applied to both the first pixel electrode 150 and the second pixel electrode 250 uniformly.

As shown in FIG. 11, the first and second common electrodes (not shown) of the lower substrate 100 and the upper substrate 200 are respectively connected with the first common line 135 and the second common line 235. Ag dots 270 are formed at the outermost portions of the first common line 135 or second common line 235 so that a common voltage signal applied from an external common voltage driver is simultaneously applied to the first and second common electrodes. FIG. 11, Ag dots 270 are formed on the second common line 235 of the upper substrate 200.

Hereinafter, a method for manufacturing the In-Plane switching mode LCD device according to an embodiment of the present invention will be described with reference to FIG. 8 to FIG. 11.

First, a metal layer is formed on the lower substrate 100, and then selectively etched, thereby forming the gate line 110 having the gate electrode 110a. The gate insulating layer 105 is then formed on the entire surface of the lower substrate 100 including the gate line 110. Subsequently, the semiconductor layer 180 is formed on the gate insulating layer 105 above the gate electrode 110a. A metal layer is then formed on the gate insulating layer 105, and selectively etched, thereby forming the source electrode 120a and the drain electrode 120b at both sides of the semiconductor layer 180, and the data line 120. The gate lines 110 and the data lines 120 are formed of either Cu, Cr, Mo, Al, Ti, Ta, or an Al alloy, such as AlNd.

Next, the first insulating layer 140 and a metal layer are formed on the entire surface of the lower substrate 100, including the data line 120, and then are selectively etched. Thus, the first common line 135 is formed to be in parallel with the gate line 110. Simultaneously, a plurality of first common electrodes 130, diverging from the first common line 135, are formed to be in parallel with the data line 120. At this time, the first common line 135 and the first common electrode 130 can be simultaneously formed of the same material as that of the gate or data line when forming the gate line 110 or the data line 120. In FIG. 10, the first common line 135 and the first common electrode 130 are formed on a different layer than the gate line 110 and the data line 120.

A passivation layer 160 is formed on the entire surface of the lower substrate, including the first common electrode 130, and then selectively etched, thereby forming a contact hole (not shown) for exposing the drain electrode 120b. The passivation layer 160 is formed of the same material as the first insulating layer 140, such as photoacryl or BenzoCycloButene (BCB), or organic insulating layer having a low dielectric constant, such as polyamide compound. The organic insulating layer having the low dielectric constant prevents vertical electric fields between the gate line 110, data line 120 or the first common electrode 130, thereby controlling crosstalk.

Subsequently, a transparent metal layer is formed on the entire surface of the lower substrate, and then selectively etched. Thus, the first pixel electrode 150 is connected with the drain electrode 120b. Also, the first pixel electrode 150 is formed in the pixel region. The first pixel electrode 150 is parallel to the first common electrodes 130 and is positioned between the respective first common electrodes 130.

Next, the conductive bar 260 is formed at one side of the diverged pattern of the first pixel electrode 150. The conductive bar 260 is formed at a height corresponding to a cell gap between the lower and upper substrates. In this state, the conductive bar 260 is formed in a cylindrical shape or a shape suitable for connecting the lower substrate 100 and upper substrate 200 to each other. Also, the conductive bar 260 can be formed in a manner similar to a method for forming a conductive spacer. The conductive bar 260 is formed of a conductive material, such as Ag, Al or AlNd.

When forming the conductive bar 260, the conductive bar 260 should have proper correspondence with both the first pixel electrodes 150 and the second pixel electrodes 250. In the process for bonding the lower substrate 100 and the upper substrate 200 to each other, the pixel electrodes 150/250 of the lower substrate 100 and the upper substrate 200 are aligned correctly, whereby the same voltage is applied thereto. Next, the process for forming the upper substrate 200 facing the lower substrate 100 can be carried out.

First, the black matrix layer 210 is formed on the upper substrate 200 corresponding to specific regions except for the pixel regions of the lower substrate 100, thereby preventing light leakage through the specific regions. Also, the color filter layer 220 is overlapped with the respective pixel regions and the black matrix layer 210 to obtain R/G/B color. Subsequently, the second common electrode 230 is formed that will correspond to the first common electrode 130 of the lower substrate 100. Then, the second insulating layer 240 is formed on the entire surface of the upper substrate 200.

After that, the second pixel electrode 250 is formed on the second insulating layer 240 corresponding to the first pixel electrode 150 of the lower substrate 100. At this time, the first/second common electrodes 130/230 and the first/second pixel electrodes 150/250 are formed of indium oxide, zinc oxide, indium-tin-oxide, tin-antimony-oxide, zinc-aluminum-oxide, or indium-zinc-oxide. However, the first/second common electrodes 130/230 and the first/second pixel electrodes 150/250 may be formed of either Cu, Cr, Mo, Al, Ti, Ta, or Al alloy, such as AlNd.

Unlike the liquid crystal between the common electrode and the pixel electrode, the liquid crystal adjacent to the first/second pixel electrodes 150/250 or the first/second common electrodes 130/230 positioned on the lower and upper substrates 100 and 200 has the alignment direction that is not changed easily according to the voltage. In an In-Plane switching mode LCD device that is a Normally Black mode, after applying the voltage, the liquid crystal adjacent to the respective electrodes is not aligned at the parallel direction to the lower and upper substrates. Thus, the portion adjacent to the electrode becomes a non-transmission region. In this respect, it is preferable to form the pixel electrodes 150/250 of metal as well as the common electrodes 130/230 of metal for prevention of light leakage.

After completing the process for forming the lower substrate 100, an alignment layer (not shown) is additionally formed on the uppermost surface of the lower substrate 100. At this time, since the conductive bar 260 is formed to have a thickness corresponding to the cell gap, the material of the alignment layer moves down at both sides of the conductive bar 260. Thus, the pixel electrodes 130/150 of the substrates are in contact with each other through the conductive bar 26 without an additional contact process.

The part of the first common line 135 or second common line 235 having the Ag dot 270 is on an outermost portion of each substrate. That is, when forming the alignment layer, the alignment material is printed inside of the outermost portion in the substrate so as to control the contact of the first common electrode 130 and the second common electrode 230 with the AG dot.

As mentioned above, after completing formation of the conductive bar 260 and Ag dot 270 on the lower substrate 100 and the upper substrate 200, the lower substrate 100 and the upper substrate 200 are bonded to each other by sealant formation and alignment process. Then, the liquid crystal layer 300 is formed between the lower and upper substrates. More particularly, before bonding the lower and upper substrates to each other, the liquid crystal is dispersed on the lower or upper substrate 100 or 200. After that, the lower and upper substrates are bonded to each other.

Accordingly, the first common electrode 130 and the first pixel electrode of the lower substrate correspond respectively to the second common electrode 230 and the second pixel electrode 250 of the upper substrate. When the same voltage signal is applied to the respective common and pixel electrodes formed on the lower and upper substrates, an electric field parallel to the lower and upper substrates is generated. As compared with the electric field in the related art forming the common and pixel electrodes on any one substrate of the lower and upper substrates, the electric field of the present invention is more uniform. Also, it is possible to obtain the electric field parallel to the lower and upper substrates with a small voltage difference between the common electrodes and the pixel electrodes. Accordingly, the liquid crystal is driven with smaller voltages, thereby decreasing power consumption.

The data voltage is applied to both pixel electrodes 150 and 250 via the drain electrode 120b of the thin film transistor TFT. The common voltage is applied to the both common electrodes 130 and 230 from the external common voltage driver. Thus, the liquid crystal is driven by the electric field according to the voltage difference between the data voltage and the common voltage.

As mentioned above, the In-Plane switching mode LCD device according to an embodiment of the present invention and the method of manufacturing the same has the following advantages.

First, the common and pixel electrodes are formed on both the lower and upper substrates in the same manner and shape. Thus, when applying the data voltage, the electric field is parallel to the lower and upper substrates through the liquid crystal layer, thereby decreasing the driving voltage. Further, the liquid crystal is stably aligned in the parallel direction to the lower and upper substrates with the low common driving voltage.

Second, the common and pixel electrodes formed on both the lower and upper substrates are formed of metal, thereby preventing light leakage.

Third, the respective pixel electrodes of the lower and upper substrates are connected to each other through the conductive bar formed on the pixel electrode of the lower substrate. Also, the respective common electrodes of the lower and upper substrates are connected to each other through Ag dot formed in the outermost portion of the common line for applying the voltage. That is, it is possible to apply the voltage to the pixel electrodes and the common electrodes formed on both the upper substrate without formation of the additional driver.

Fourth, the conductive bar serves as a spacer for maintaining the cell gap between the lower and upper substrates. Thus, it is possible to omit the process for forming a spacer.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An In-Plane switching mode liquid crystal display (LCD) device comprising:
   lower and upper substrates;
   gate and data lines crossing each other on the lower substrate to define a pixel region;
   a plurality of first common electrodes diverging in the pixel region at fixed intervals;
   a first pixel electrode in the pixel region between the first common electrodes;
   second common electrodes and second pixel electrodes on the upper substrate respectively corresponding to the first common electrodes and the first pixel electrodes on the lower substrate; and
   a liquid crystal layer between the lower and upper substrates.

2. The In-Plane switching mode LCD device of claim 1, further comprising a conductive bar electrically connecting the first and second pixel electrodes to each other.

3. The In-Plane switching mode LCD device of claim 2, wherein the conductive bar is formed of any one of Ag, Al, and an Al alloy.

4. The In-Plane switching mode LCD device of claim 1, wherein the same voltage is applied to the first and second common electrodes from an external driving circuit.

5. The In-Plane switching mode LCD device of claim 1, further comprising Ag dot for connecting the first and second common electrodes to each other.

6. The In-Plane switching mode LCD device of claim 1, wherein the first common electrode is formed on the different layer from the first pixel electrode.

7. The In-Plane switching mode LCD device of claim 1, further comprising a thin film transistor adjacent a crossing of the gate and data lines.

8. The In-Plane switching mode LCD device of claim 1, further comprising:
   a black matrix layer on specific portions of the upper substrate except for the pixel regions of the lower substrate; and
   a color filter layer on the portions of the upper substrate corresponding to the respective pixel regions of the lower substrate.

9. The In-Plane switching mode LCD device of claim 1, wherein the first common electrode is formed in the same layer as the gate line or data line.

10. The In-Plane switching mode LCD device of claim 1, wherein an electric field parallel to the lower and upper substrates is formed between the first common electrode and the first pixel electrode, and an electric field parallel to the lower and upper substrates is formed between the second common electrode and the second pixel electrode when applying the voltage to the respective electrodes of the lower and upper substrates.

11. The In-Plane switching mode LCD device of claim 1, wherein the first and second common electrodes and the first and second pixel electrodes are formed of any one of Cu, Cr, Mo, Al, Ti, Ta and Al alloy.

12. The In-Plane switching mode LCD device of claim 1, wherein the first and second common electrodes and the first and second pixel electrodes are formed of any one of indium oxide, zinc oxide, indium-tin-oxide, tin-antimony-oxide, zinc-aluminum-oxide, and indium-zinc-oxide.

13. A method for manufacturing an In-Plane switching mode liquid crystal display (LCD) device comprising the steps of:
   preparing lower and upper substrates;
   forming gate and data lines crossing each other on the lower substrate to define a pixel region;
   forming a plurality of first common electrodes diverging in the pixel region at fixed intervals;
   forming a first pixel electrode in the pixel region between the first common electrodes;
   forming a second common electrode on the upper substrate corresponding to the first common electrode;
   forming a second pixel electrode on the upper substrate corresponding to the first pixel electrode; and
   forming a liquid crystal layer between the lower and upper substrates.

14. The method of claim 13, further comprising the step of forming a conductive bar on the first pixel electrode to electrically connect the first and second pixel electrodes to each other.

15. The method of claim 14, wherein the conductive bar is formed of any one of Ag, Al, and an Al alloy.

16. The method of claim 13, wherein the same common voltage is directly applied to the first and second common electrodes from an external driving circuit.

17. The method of claim 16, further comprising the step of forming an Ag dot in the outermost portion of the lower and upper substrates to connect the first and second common electrodes to each other.

18. The method of claim 13, wherein the first common electrode is formed on the different layer from the first pixel electrode according as an insulating layer is interposed between the first common electrode and the first pixel electrode.

19. The method of claim 13, further comprising the step of forming a thin film transistor adjacent to a crossing of the gate and data lines.

20. The method of claim 13, wherein the first common electrode is formed on the same layer as the gate or data line.

21. The method of claim 13, wherein the first and second common electrodes and the first and second pixel electrodes are formed of any one of Cu, Cr, Mo, Al, Ti, Ta, and an Al alloy.

22. The method of claim 13, wherein the first and second common electrodes and the first and second pixel electrodes are formed of any one of indium oxide, zinc oxide, indium-tin-oxide, tin-antimony-oxide, zinc-aluminum-oxide, or indium-zinc-oxide.

* * * * *